US006931054B2

United States Patent
Schmidt et al.

(10) Patent No.: US 6,931,054 B2
(45) Date of Patent: Aug. 16, 2005

(54) METHOD FOR ESTIMATING CHANNEL PARAMETERS OF RADIO CHANNELS OF A W-CDMA MOBILE RADIO SYSTEM

(75) Inventors: Peter Schmidt, Ellerstadt (DE); Jörg Plechinger, München (DE); Michael Schneider, München (DE); Markus Doetsch, Schliern (CH); Tideya Kella, München (DE); Peter Jung, Otterberg (DE)

(73) Assignee: Infineon Technologies AG, Munich (DE)

(*) Notice: Subject to any disclaimer, the term of this patent is extended or adjusted under 35 U.S.C. 154(b) by 129 days.

(21) Appl. No.: 10/219,600

(22) Filed: Aug. 15, 2002

(65) Prior Publication Data

US 2003/0043890 A1 Mar. 6, 2003

Related U.S. Application Data

(63) Continuation of application No. PCT/DE01/00595, filed on Feb. 14, 2001.

(30) Foreign Application Priority Data

Feb. 15, 2000 (DE) .......................................... 100 06 520

(51) Int. Cl.[7] .............................. H04B 1/69; H04B 3/20
(52) U.S. Cl. ......................... 375/148; 375/149; 370/292
(58) Field of Search ................................. 375/140, 147, 375/148, 316, 260, 324, 224; 370/522, 524; 728/100, 110

(56) References Cited

U.S. PATENT DOCUMENTS

| 5,619,524 | A | * | 4/1997 | Ling et al. .................... 375/130 |
| 6,625,236 | B1 | * | 9/2003 | Dent et al. ................... 375/341 |
| 6,654,429 | B1 | * | 11/2003 | Li ................................ 375/316 |

| 2003/0043887 | A1 | * | 3/2003 | Hudson ........................ 375/144 |
| 2003/0189992 | A1 | * | 10/2003 | Nefedov ....................... 375/340 |

FOREIGN PATENT DOCUMENTS

| DE | 197 47 457 A1 | 4/1999 |
| EP | 0 969 604 A2 | 1/2000 |
| WO | WO 01/10093 A1 | 2/2001 |

OTHER PUBLICATIONS

Dong Xiaojian et al, A Novel Method of Channel Estimation for W–CDMA, Fifth Asia–Pacific Conference, Oct. 12, 1999, pp. 582–585.*

Lindoff B. et al, "Channel Estimation for the W–CDMA System, Performance and Robustness Analysis from a Terminal Perspective", IEEE Conference Proceedings (XP000903498), pp. 15651569.*

Lindoff, B. et al.: "Channel Estimation For The W–CDMA System, Performance And Robustness Analysis From A Terminal Perspective", IEEE, 1999, pp. 1565–1569.

Frey, T. et al.: "Investigation Of Channel Estimation For W–CDMA (UMTS FDD–Mode)", VDE–Verlag, No. 157, Oct. 1999, pp. 225–228.

(Continued)

*Primary Examiner*—Jay K. Patel
*Assistant Examiner*—Qutub Ghulamali
(74) *Attorney, Agent, or Firm*—Laurence A. Greenberg; Werner H. Stemer; Ralph E. Locher (57) ABSTRACT

A method for estimating channel parameters of radio channels of a W-CDMA mobile radio system, for example in accordance with the UMTS standard includes transmitting sequences of known symbols between unknown data symbols by a base station. The channel estimation is carried out by a comparison of the received sequences with the known symbols, and the result of the comparison is integrated over a sequence of known symbols.

5 Claims, 3 Drawing Sheets

OTHER PUBLICATIONS

Xiaojian, D. et al.: "A Novel Method Of Channel Estimation For W–CDMA", Fifth Asia–Pacific Conference On Communications And Fourth Optoelectronics And Communications Conference, Oct. 1999, pp. 582–585.

Cacopardi, S. et al.: "Channel Estimation And Tacking Of An Indoor Orthogonal Multicarrier DS–CDMA System Using Measured Channel Delay Profiles", IEEE, 1996, pp. 1559–1563.

Schmidl, T.M. et al.: "The Use Of Interative Channel Estimation (ICE) To Improve Link Margin In Wideband CDMA Systems", IEEE, 1999, pp. 1307–1311.

Dahlmann, E. et al.: "WCDMA–The Radio Interface For Future Mobile Multimedia Communications", IEEE, 1998, pp. 1105–1118.

Samukic, A.: "UMTS Universal Mobile Telecommunications System: Development Of Standards For The Third Generation", IEEE, vol. 47, 1998, pp. 1099–1104.

Jung, P.: "Wichtige Algorithmen zur Kanalschätzung" [Important Algorithms Of Channel Estimation], Analyse und Entwurf Digitaler Mobilfunksysteme [Analysis And Design Of Digital Mobile Phone Systems], B.G. Teubner, 1997, pp. 201–204.

Ojanperä, T. et al.: "Wideband CDMA For Third Generation Mobile Communications", Artech House, 1998, pp. 106–107.

German Published Non–Prosecuted Patent Application DE 197 47 457 A1 (Ritter), dated Apr. 29, 1999, Method And Configuration For Transmitting Data Through A Radio Interface In A Radio Communications System.

European Patent Application EP 0 969 604 A2 (Schmidl et al.), dated Jan. 5, 2000.

PCT WO 01/10093 A1 (Jung et al.), dated Feb. 8, 2001.

International Search Report, dated Jul. 19, 2001.

* cited by examiner

METHOD FOR ESTIMATING CHANNEL PARAMETERS OF RADIO CHANNELS OF A W-CDMA MOBILE RADIO SYSTEM

CROSS-REFERENCE TO RELATED APPLICATION

This application is a continuation of copending International Application No. PCT/DE01/00595, filed Feb. 14, 2001, which designated the United States and was not published in English.

BACKGROUND OF THE INVENTION

Field of the Invention

The present invention relates to a method for estimating channel parameters of radio channels of a W-CDMA mobile radio system in which sequences of known symbols are transmitted between unknown data symbols by a base station. The channel estimation is carried out by comparison of the received sequences with the known symbols, and the result of the comparison is integrated over a sequence of known symbols.

The present invention is concerned with the problem of channel estimation in cellular radio systems with W-CDMA (wide band code division multiple access), such as the one described in detail, for example, in the literature in P. Jung "Analyse und Entwurf digitaler Mobilfunksysteme" [Analysis and Design of Digital Mobile Phone Systems], B. G. Taubner Verlag, Stuttgart, Germany, 1997, and in the periodical IEEE Transaction on Vehicular Technology, volume 47, No. 4 of November 1998 in the article "W-CDMA The Radio Interface for Future Mobile Multi-Media Communication". That method is of considerable importance because it is intended to form the worldwide standard for third-generation mobile phone technology, as explained in IEEE Transactions on Vehicular Technology, volume 47, No. 4 of November 1998 in the article "UMTS Universal Mobile Telecommunication Systems: Development of Standards for the Third Generation".

In mobile phone systems, it is always necessary to take into account the problem of the movement of the mobile receiver continuously changing the properties of the transmission channels. It is of overriding importance that the respective receiver has the best possible hypotheses with respect to the channel parameters at a given time, in order to ensure a good degree of detection of the transmitted signals.

For that purpose, various physical channels for channel estimation are to be provided at the system end in the future UMTS standard for mobile phone systems. On the one hand, a sequence of symbols, which are known by the subscriber, referred to as dedicated pilot symbols, is transmitted to a specific subscriber by a base station. On the other hand, in continuous operation for all subscribers, the base station transmits a sequence of pilot symbols, which is known to the subscribers on a common channel, referred to as the common pilot channel.

The most pertinent prior art relates to the currently available mobile phone system ANSI-95 (in the USA). However, the system makes exclusive use of the estimation of the channel parameters using the common channel, and the signals that are emitted on that channel and are known to all subscribers (i.e., common pilot signals). The ANSI-95 system uses algorithms from the prior art that are based on channel estimation using integration over the pilot signals for this purpose.

However, it has the disadvantage that the transmission power, which is used for the common channel and the spread factor are not necessarily also suitable for the channel that the specific subscriber is using. The greater the difference in power or the difference in spread factors with which the various channels are transmitted, the greater the systematic error in the determination of the channel parameters for the channel of the individual subscriber as a result of simply transferring the channel parameters of the common channel.

SUMMARY OF THE INVENTION

It is accordingly an object of the invention to provide a method for estimating channel parameters of radio channels of a W-CDMA mobile radio system that overcomes the hereinafore-mentioned disadvantages of the heretofore-known devices of this general type.

With the foregoing and other objects in view, there is provided, in accordance with the invention, a method for estimating channel parameters of radio channels of a W-CDMA mobile radio system, which includes the steps of: transmitting sequences of known symbols between unknown data symbols with a base station; carrying out channel estimation by comparing received sequences of known symbols with the known symbols; and integrating a result of the comparison over a sequence of known symbols while using a mean value of channel estimations of a two last chronologically successive sequences of known symbols as a hypothesis for the channel parameters for detecting the data symbols.

Accordingly the method considerably improves the estimates of the channel parameters for the subscriber-specific channels. Sequences of known symbols are transmitted between the unknown data symbols by a base station. The channel estimation is carried out by a comparison of the received sequences of known symbols with the known symbols. The result of the comparison is integrated over a sequence of known symbols. The mean value of the channel estimations of the last two chronologically successive sequences of known symbols is used as a hypothesis for the actual current channel parameters in the region of the intermediate unknown symbols.

In accordance with another mode of the invention, the method further includes the steps of: transmitting a first sequence of known symbols directly before the data symbols; transmitting a second sequence of known symbols directly after the data symbols; carrying out an interpolation between the channel parameters from the first and second sequences; and determining a hypothesis for the channel parameters for detecting the data symbols.

Accordingly, an interpolation is carried out between the channel estimations from the sequence of known symbols, which is transmitted directly before the data symbols and the sequence of known symbols, which is transmitted directly thereafter. This is done in order to determine a hypothesis for the channel parameters for detecting the data symbols.

In accordance with a further mode of the invention, the method further includes the steps of: determining the last two sequences of known symbols transmitted before the data symbols; carrying out an interpolation between the channel parameters from the last two sequences of known symbols; and determining a hypothesis for the channel parameters for detecting the data symbols.

Accordingly, an interpolation is carried out between the channel parameters from the last two sequences of known symbols transmitted before the data symbols in order to determine a hypothesis for the current actual channel estimations.

In accordance with an added mode of the invention, the method further includes the step of determining a hypothesis for present channel parameters when a speed of movement of a mobile receiver is low.

In accordance with an additional mode of the invention, the method further includes the step of determining a hypothesis for present channel parameters when a speed of movement of a mobile receiver is high and data rates of transmission are low.

In accordance with yet another mode of the invention, the method further includes the step of determining a hypothesis for present channel parameters when a speed of movement of a mobile receiver is high and data rates of transmission are high.

According to the invention, it is preferred that, when the speed of movement of the mobile receiver is low, the first method is used to determine a hypothesis for the present channel parameters, and when the speed of movement of the mobile receiver is high and the data rates of transmission are low, the second method is used to determine a hypothesis for the present channel parameters. When the speed of movement of the mobile receiver is high and the data rates of the transmission are high, the third method is used to determine a hypothesis for the present channel parameters. In this way, the advantages of the methods according to the invention can be combined in an optimum way to estimate channel parameters.

With the objects of the invention in view, there is also provided a method for estimating channel parameters of radio channels of a W-CDMA mobile radio system, which contains the steps of: continuously transmitting a sequence of known symbols on a common channel (common pilot channel) with a base station to all subscribers; transmitting sequences of known symbols between unknown data symbols on subscriber-specific channels; carrying out channel estimation by comparing received sequences of known symbols with the known symbols; carrying out an estimation of the channel parameters for the subscriber-specific channels by referring to the known symbols transmitted with the subscriber-specific channels; and correcting the estimation of the channel parameters for the subscriber-specific channels between the emissions of the known symbols on the subscriber-specific channels by referring to a change in the channel parameters estimated by reference to the symbols transmitted in continuous operation on the common channel.

In accordance with yet a further mode of the invention, the method further includes the step of correcting the estimated channel parameters for the subscriber-specific channels according to the following formula:

$$\hat{\underline{h}}^d_{n+1} = \hat{\underline{h}}^d_n + k \cdot \Delta \hat{\underline{h}}^p_{n+1},$$

wherein $\hat{\underline{h}}^d_n$ represents an estimation of the channel pulse response of a respective subscriber-specific channel at a time n; $\Delta \hat{h}^p_{n+1}$ represents a change in the estimation of the channel pulse response of the common channel between times n and n+1; and k represents an adjustable correction factor.

In accordance with yet an added mode of the invention, present indexing relates to a case in which the data-transmitting channel and the common pilot channel have the same spread factor, and when there are different spread factors, the indexing is converted according to a ratio of spread factors.

Accordingly, the base station emits a sequence of known symbols on a common channel in continuous operation for all subscribers. Sequences of known symbols (dedicated pilot symbols) are transmitted between unknown data symbols on subscriber-specific channels. The estimation of the channel parameters for the subscriber-specific channel or channels is preferably carried out between the emissions of the known symbols on the subscriber-specific channels by reference to the change in the channel parameters estimated in continuous operation on the common channel. The change in parameters is converted to a corresponding change in the parameters of the subscriber-specific channels. In this way, even very rapid changes in the channel structure can be followed without too much transmission time being used for user data for transmitting known symbols for estimating the subscriber-specific channels.

In accordance with a concomitant mode of the invention, the correction of the estimated channel parameters for the subscriber-specific channel or channels is carried out according to the following formula:

$$\hat{\underline{h}}^d_{n+1} = \hat{\underline{h}}^d_n + k \cdot \Delta \hat{\underline{h}}^p_{n+1},$$

with $\hat{\underline{h}}^d_n$ representing the estimation of the channel pulse response of the respective subscriber-specific channel at the time n and $\Delta \hat{\underline{h}}^p_{n+1}$ representing the change in the estimation of the channel pulse response of the common channel between the times n and n+1, and k representing an adjustable correction factor.

Other features which are considered as characteristic for the invention are set forth in the appended claims.

Although the invention is illustrated and described herein as embodied in a method for estimating channel parameters of radio channels of a W-CDMA mobile radio system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The described exemplary embodiment of the invention is concerned with the channel estimation in the mobile radio system UMTS. In the mobile radio system, various physical channels from the system side are provided for channel estimation. On the one hand, a sequence of symbols, which is known by the subscriber, i.e, the dedicated pilot symbols, is transmitted from a base station to a specific subscriber on the subscriber-specific channel. On the other hand, the base station continuously transmits (to all subscribers) using the common channel (common pilot channel), where the sequence is known by the subscribers.

The present invention proposes various methods of channel estimation, which are based on the dedicated pilot symbols in the subscriber-specific channels and on the general pilot symbols, and combinations of both.

According to the prior art, which represents the currently available mobile phone system ANSI 95, it is only possible to estimate the channel parameters using the common channel. At present, algorithms that are based on channel estimation using integration over the pilot symbols are used for this purpose.

However, in the UMTS system and the continuously transmitted pilot symbols on the common channel, pilot symbols are also available in each subscriber-specific channel. As long as the power or the spread factors of the subscriber-specific channels and of the common channel lie relatively far apart, the parameters that are determined for the channel estimation by the common channel can no longer be readily transmitted on the subscriber-specific channel. There remains an error in the estimation of the channel parameters. As a result, the quality of the detection of the subscriber-specific signals becomes worse. The object of the present invention is to considerably improve the channel estimation.

In one mobile phone receiver of the invention, the channel parameters are estimated by firmware in a digital signal processor. All the despread symbols of each RAKE finger of the receiver can be transmitted to the digital signal processor via a databus. The amplitude and the phase angle of the corresponding individual path of the channel can be estimated by referring to the individual symbols of each RAKE finger.

The present invention presents three different methods for estimating the channel parameters. The method, which is actually to be used, is preferably selected referring to the operating situation of the mobile receiver:

1) The channel parameters are estimated by forming averages over the pilot signals in the subscriber-specific channel.

This method can be used for all data rates, at speeds, of the mobile receiver, up to 100 km/h.

2) Channel estimation by interpolation between the channel parameters determined by reference to the current pilot symbols and the last previous pilot symbols.

This method can be used for high speeds of movement of the mobile receiver and services, up to 64 kbit/s, when transmitting using an individual code with a spread factor of 32 and greater.

3) Channel estimation by interpolation of the channel parameters from the parameters, which have been determined from the previous and next to the last transmission, by reference to the known symbols.

This method can be used for all services.

Accordingly, the methods according to the invention will be described in detail below:

The estimation of the channel parameters is always based on the fact that symbols, which are known by the base stations are transmitted, and, are compared by the mobile receiver with the symbols actually received. In this way, it is possible to determine a hypothesis for the transmission characteristic of the channel. The corresponding channel parameters are obtained by integration over a series of known symbols.

During the period in which pilot symbols are received, the channel can be estimated by evaluating the received pattern of the known pilot symbol sequence obtained after the decryption and despreading. The estimation is carried out with reference to the integration result, either by a partial or the entire pattern of the known transmitted pilot symbol sequence. This means that the received signal is despread by a RAKE receiver (in each case, individually in the RAKE fingers) and equalized. The effect of noise is reduced by integration over the received pilot symbols. This results, for example, in the following formula for channel estimation for the l-th finger of the RAKE receiver:

$$h_l^r = \frac{1}{N_{pilot}} \sum_{k=0}^{N_{pilot}-1} \frac{p_k^r \cdot d_{l,k}^r + p_k^i \cdot d_{l,k}^i}{(p_k^r)^2 + (p_k^i)^2}$$

$$h_l^i = \frac{1}{N_{pilot}} \sum_{k=0}^{N_{pilot}-1} \frac{p_k^r \cdot d_{l,k}^i - p_k^i \cdot d_{l,k}^r}{(p_k^r)^2 + (p_k^i)^2}$$

with $h_l^r$ being the real part and $h_l^i$ being the virtual part of the channel estimation for the l-th path, $N_{pilot}$ being the number of pilot symbols to be compared, and $d_{l,k}$ being the received signal from the l-th path and $p_k$ being the known pilot symbol.

In this way, an estimated channel weighting for each finger is obtained. The estimated channel weighting is used to combine the maximum conditions; the combination is in turn carried out by hardware.

According to the invention, in the case of a low speed of movement of the mobile receiver (i.e., if the surroundings and thus the channel pulse response fluctuate very slowly), a mean value is formed from the estimated channel parameters of two successive sequences of pilot symbols.

When the channels change very quickly and the data rates are low (which occur, for example, at high speeds of movement), the channel pulse response changes very quickly, and the current channel pulse response that relates to the symbols at the end of a time slot can thus deviate considerably from the estimated channel response. In order to reduce this systematic estimation error, it is proposed according to the invention to correct these changes in the channel pulse response between two successive sequences of known symbols. The selected algorithm is referred to as phase correction by interpolation. This method is based on the integration over the pilot symbols, which is described above. The data symbols and control symbols received between two successive sequences of known symbols are determined by channel parameters. The determination is carried out by the interpolation of the channel estimations of the two surrounding sequences of known symbols. The phase angle and amplitude are estimated by linear interpolation of the phase and amplitude by reference to the estimation on the basis of the current pilot symbols and the preceding sequence of pilot symbols. However, it is necessary to buffer the received symbols (at least the received data symbols and control symbols) for the duration of one time slot. The channel pulse response can then be calculated as follows:

$$h_l(n) = h_l(0) + \frac{h_l(N_s) - h_l(0)}{N_s} \cdot n, \quad n = 0 \ldots N_s - 1,$$

with n representing the symbol number, $N_s$ representing the number of symbols in a time slot and $h_l(n)$ representing the channel estimation at the time n, $h_l(o)$ representing the channel estimation by reference to the previous known symbols and $h_l(N_s)$ representing the channel estimation by reference to the following known symbols.

The method requires a high expenditure on storage, in particular at relatively high data rates. The storage required for buffering the symbols of a time slot for a 64 kbit/s service on a subscriber-specific physical data channel (dedicated physical data channel=DPDCH) can be estimated as follows:

Assuming that there are six fingers, which follow three relevant paths of two base stations using an r=⅓ turbo coding (scenario of the soft handover), a data rate of 192 kbit/s on the physical data channel is reached. This is at the rate of 4.096 Mchips/s, 120 bits per time slot in a system with a code element rate (chip rate). When a spread factor of 32 is used, 144 bits can be transmitted per time slot. The storage requirement for buffering the symbols is therefore determined by assuming that the calculation of the estimation for the channel parameters requires two time slots—one time slot for the data symbols and control symbols that are to be detected by reference to the interpolated channel parameters, and one time slot for the newly received data symbols and control symbols, as follows:

2(time slots)×6(fingers)×80(symbols)=960×16 bits (I and Q components).

For a service with 144 kbit/s with a spread factor of 16, the same calculation yields the result of 1920×16 bits.

For rapidly changing channels at high data rates (which occur, for example, at high speeds of movement), the channel pulse response changes very quickly. Therefore, the actual channel pulse response that influences the symbols at the end of a time slot differs systematically from the estimated channel pulse response that has been calculated on the basis of the pilot symbols at the start of the time slot. According to the invention, it is therefore proposed to improve the channel estimation by interpolation using the two previous sequences of known symbols (pilot symbols).

This method is also based on the integration over the pilot symbols, which is described above. The data symbols and control symbols are detected with channel parameters, which are obtained by interpolation of the channel estimation of the two preceding pilot sequences. It is therefore not necessary to buffer the symbols for the duration of two time slots. The channel pulse response can be represented as follows:

$$h_l(n) = h_l(N_s) + \frac{h_l(N_s) - h_l(0)}{N_s} \cdot n, \quad n = 0 \ldots N_s - 1,$$

with n being the number of symbols, $N_s$ being the number of symbols in a time slot and $h_l(n)$ being the channel estimation at the time n.

In addition, it is to be noted that conventional methods of prediction can also be used for channel estimation for mobile phones. However, these methods have the disadvantage that the signal processing complexity increases as the filter length increases.

Because both dedicated and general pilot symbols are used in the UMTS mobile phone system (which is currently being standardized), the present invention also proposes a combination of the evaluation of both signals to improve the channel estimation. As a result, a better reception characteristic of the mobile receiver is obtained. The estimation of the channel pulse response is preferably combined on the basis of the general pilot symbol, which is emitted for all subscribers, and the methods according to the invention, which are described above. Because the general pilot signal (common pilot channel) is continuously transmitted for the duration of one time slot, it can be used satisfactorily to determine a current channel pulse response. However, because the general pilot signal is emitted by the base station with a different power than the subscriber-specific signal, the current channel pulse response that is determined in this way is in error in comparison with the actual current channel pulse response for the subscriber-specific channel. Particularly satisfactory results can be obtained only if the information relating to the channel parameters from suitable signals is combined in a suitable form.

Figure 1:
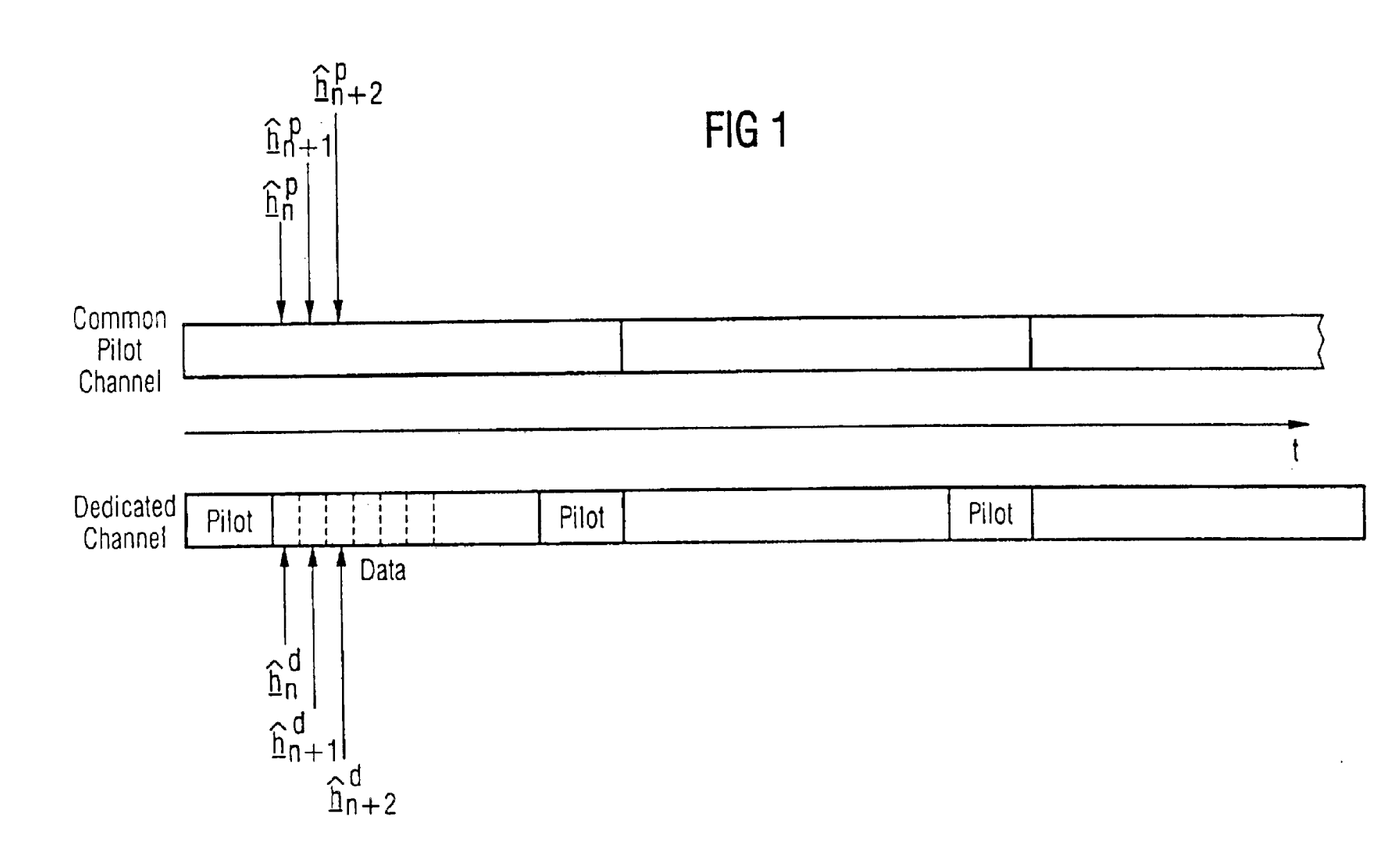
FIG. 1 is a diagram showing the structure of the common channel and the subscriber-specific channel, each plotted over the same time axis.

Referring now to the figures of the drawings in detail and first, particularly to FIG. 1 thereof, there is shown a common channel (common pilot channel) on which the base station continuously transmits sequences of known signals for all subscribers. A subscriber-specific channel (dedicated channel) in which sequences of known symbols (pilot sequences) and sequences of unknown symbols (data) are transmitted alternately is also shown. Both channels are plotted over the same time axis t, and have the same spread factor in this embodiment.

According to the invention, it is possible to proceed as follows: The current channel pulse response of the subscriber-specific channel is known at the end of the transmission of a sequence of known symbols (pilot sequence) on the subscriber-specific channel. It is designated by $\hat{\underline{h}}_n^d$ as the time of the transmission of the first data-carrying symbol (unknown symbols) after the pilot symbols is referred to as "n". At the same time, the channel pulse responses of the common channel (common pilot channel) are known at each time n, n+1, . . . since only known symbols are emitted on this channel. The corresponding channel pulse responses are designated as $\hat{\underline{h}}_n^p$, $\hat{\underline{h}}_{n+1}^p$, etc., According to the invention, the channel estimation for the subscriber-specific channel $\hat{\underline{h}}_{n+1}^d$ can be calculated iteratively at the time n+1 (from the information according to one of the following formulae). In order to simplify the representation of the formulae, it is assumed that the data-carrying channel and the common pilot channel have the same spread factor. Of course, the channel estimation can be performed for different spread factors in a similar way. All that is necessary is to appropriately change the indexing of the formula:

$$\hat{\underline{h}}_{n+1}^d = \hat{\underline{h}}_n^d + k \cdot (\hat{\underline{h}}_{n+1}^p -$$

The factor k is referred to as a power correction factor. It indicates the degree to which a change in the channel parameters of the common channel influences the subscriber-specific channel (due to different transmission powers).

In order to approximate the estimation of the channel pulse response of the subscriber-specific channel at the time n+1 even more precisely, the following formula is proposed according to the invention:

$$\hat{h}_{n+1}^d = \hat{h}_n^d + \frac{\left(\Delta \hat{\underline{h}}^d + k \cdot (h_{n+1}^p - h_n^p)\right)}{2}$$

where $\Delta \hat{\underline{h}}^d$ represents a correction factor which, for example, can be determined empirically.

Figure 2:
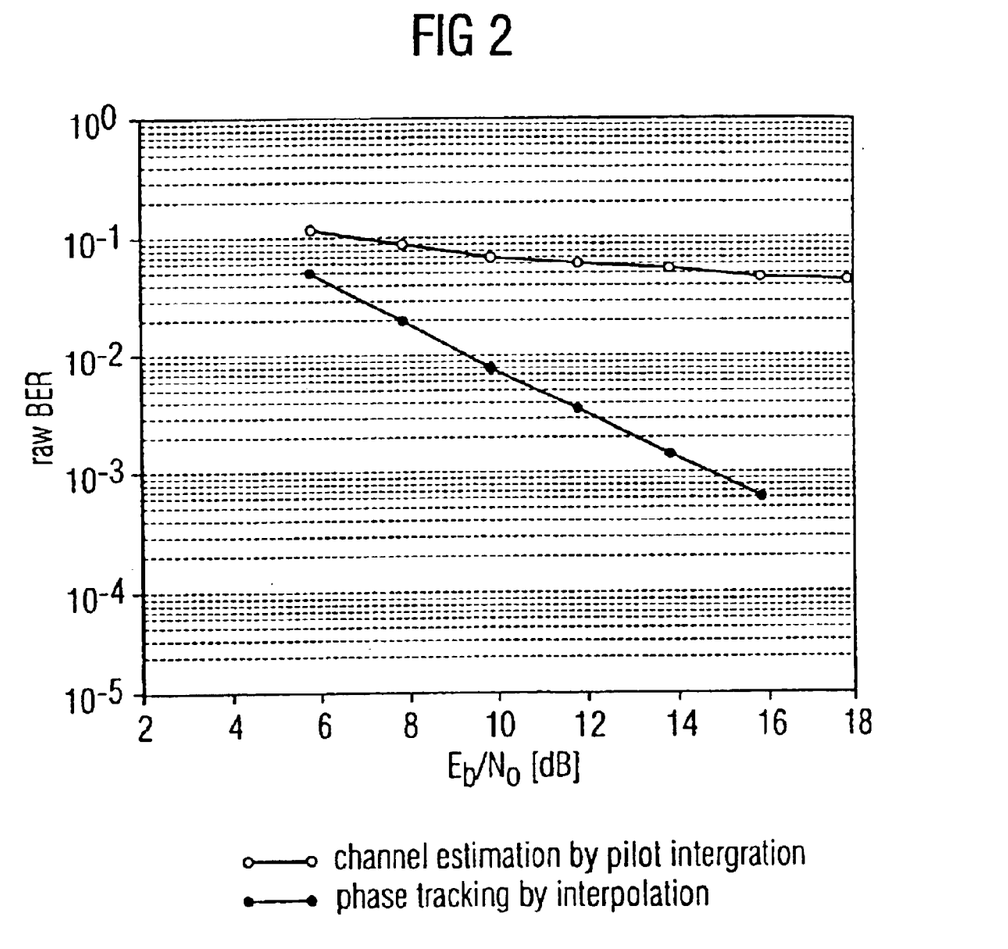
FIG. 2 is a graph of the raw bit error rate from a simulation as a function of the channel quality.
Figure 3:
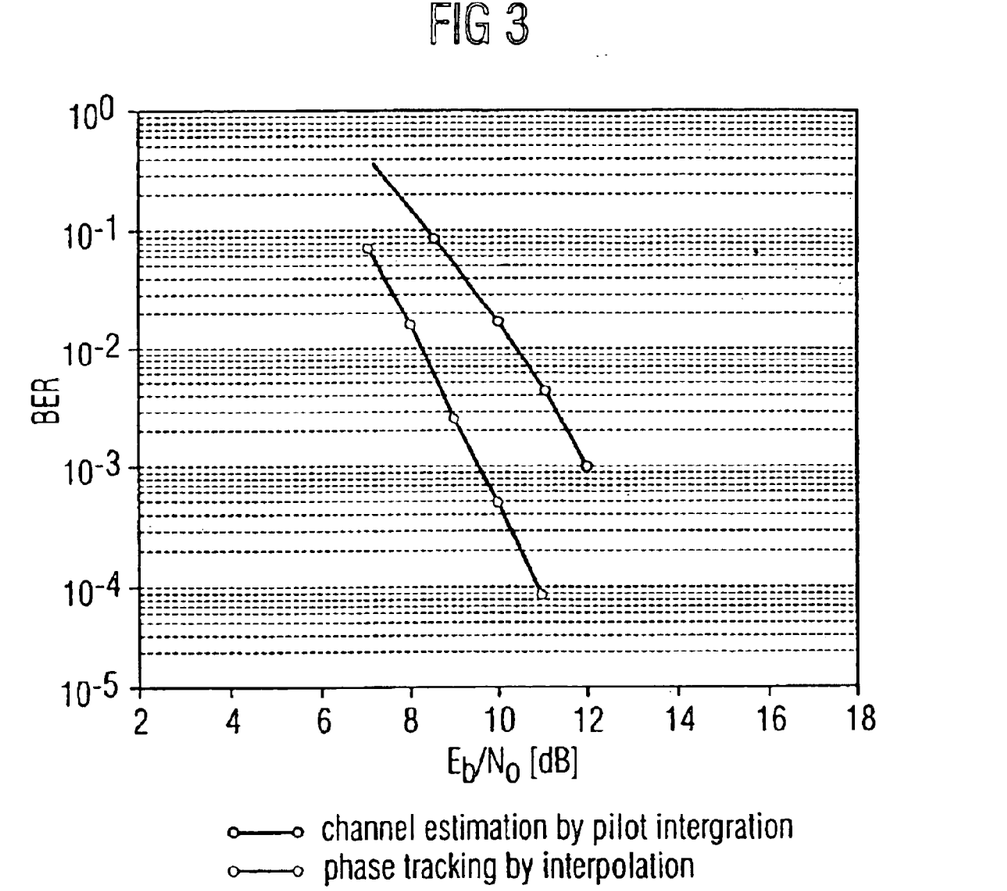
FIG. 3 is a graph showing the bit error rate from the simulation in FIG. 2.

The advantages of the channel estimation according to the invention will now be explained by referring to FIGS. 2 and 3. FIGS. 2 and 3 show simulation results for a mobile phone transmission channel, while taking into account the correction algorithm (correction of the channel parameters by interpolation) in comparison with the known methods of channel estimation by integration over the pilot signals. The raw bit error rate is plotted in FIG. 2, and the bit error rate is plotted against the signal/noise ratio of the channel in FIG. 3. Circles represent the measured values with the channel estimation method according to the prior art (ANSI 95), while asterisks (*) indicate the simulation results with the interpolation method of the present invention. The considerably better results, which are achieved by the invention, are clearly shown.

The simulations were carried out with the COSSAP simulation tool. A downlink (data transmission from the base station to the mobile receiver) was assumed in all of the simulations. The simulations were carried out for the ITU vehicle, a channel model and for a voice service with a data rate of 8 kbit/s. The data rate was represented by a spread factor of 128. The speed of movement of the mobile receiver was V=200 km/h. No power control or power regulating mechanism was used in the simulations. The ⅓ rate channel coder from the UTRA description was used in the simulations. The simulations also consider all service data, specifically the rate adaptation, the service data bits and the pilot symbols.

We claim:

1. A method for estimating channel parameters of radio channels of a W-CDMA mobile radio system, which comprises the steps of:

transmitting sequences of at subscriber side a priori known symbols before at subscriber side a priori unknown data symbols from a base station;

determining the last two sequences of known symbols transmitted before the data symbols;

carrying out a first channel estimation by comparing the last two received sequences of known symbols with the at subscriber side stored known symbols;

carrying out a second channel estimation by comparing a penultimate received sequence of known symbols with the at subscriber side stored known symbols;

carrying out an intexpolation between channel parameters derived from the first channel estimation and channel parameters derived from the second channel estimation; and determining a hypothesis for the channel parameters for detecting the data symbols based on the interpolation.

2. The method according to claim 1, which further comprises the step of performing the steps of claim 1 to determine a hypothesis for present channel parameters when a speed of movement of a mobile receiver is high and data rates of transmission are high.

3. A method for estimating channel parameters of radio channels of a W-CDMA mobile radio system, which comprises the steps of:

continuously transmitting a sequence of first at subscriber side a priori known symbols on a common channel (common pilot channel) from a base station to all subscribers;

transmitting sequences of second at subscriber side a priori known symbols chronologically between unknown data symbols on one or more subscriber-specific channels;

carrying out an estimation of the channel parameters for the one or more subscriber-specific channels with the at subscriber side stored second known symbols by comparing received second known symbols transmitted with the one or more subscriber-specific channels with the at subscriber side stored second known symbols;

carrying out an estimation of the channel parameters for the common channel by comparing received first known symbols continuously transmitted on the common channel with the at subscriber side stored first known symbols; and correcting the estimation of the channel parameters for the one or more subscriber-specific channels while no second known symbols on the one or more subscriber-specific channels are transmitted corresponding to a change in the channel parameters for the common channel.

4. The method according to claim 3, which further comprises the step of:

correcting the estimated channel parameters for the subscriber-specific channels according to the following formula:

$$\hat{\underline{h}}^d_{n+1} = \hat{\underline{h}}^d_n + k \cdot \Delta \hat{\underline{h}}^p_{n+1},$$

wherein $\hat{\underline{h}}_n$ represents an estimation of the channel pulse response of a respective subscriber-specific channel at a time n; $\Delta \hat{\underline{h}}^p_{n+1}$ represents a change in the estimation of the channel pulse response of the common channel from times n to time n+1; and k represents an adjustable correction factor.

5. The method according to claim 4, wherein:

present indexing relates to a case in which the data-transmitting channel and the common pilot channel have the same spread factor; and when there are different spread factors, the indexing is converted according to a ratio of spread factors.

* * * * *

UNITED STATES PATENT AND TRADEMARK OFFICE
CERTIFICATE OF CORRECTION

| | |
|---|---|
| PATENT NO. | : 6,931,054 B2 |
| APPLICATION NO. | : 10/219600 |
| DATED | : August 16, 2005 |
| INVENTOR(S) | : Peter Schmidt et al. |

It is certified that error appears in the above-identified patent and that said Letters Patent is hereby corrected as shown below:

In the Claims

Column 9

Line 30, "intexpolation" should read -- interpolation --

Signed and Sealed this
Twenty-first Day of May, 2013

Teresa Stanek Rea
*Acting Director of the United States Patent and Trademark Office*